Figure 1:
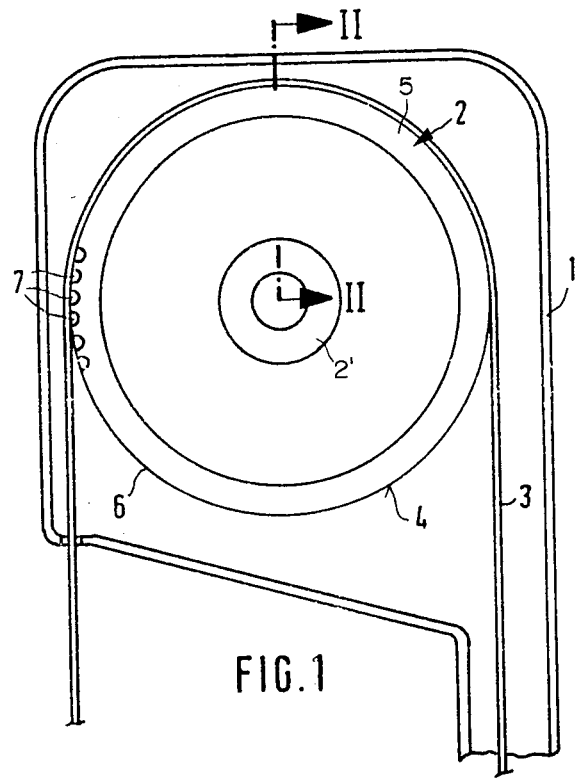

United States Patent [19]

Binder et al.

[11] Patent Number: 4,622,748
[45] Date of Patent: Nov. 18, 1986

[54] GUIDE ROLLER FOR BAND SAWS

[75] Inventors: Werner Binder, Stuttgart; Gerhard Gresser, Oberboihingen; Alfred Dettelbach, Stuttgart, all of Fed. Rep. of Germany

[73] Assignee: REICH Spezialmaschinen GmbH, Nuertingen, Fed. Rep. of Germany

[21] Appl. No.: 512,552

[22] Filed: Jul. 11, 1983

[30] Foreign Application Priority Data

Jul. 22, 1982 [DE] Fed. Rep. of Germany ....... 3227399

[51] Int. Cl.⁴ ..................... B23D 55/00; B23D 47/00; F16H 55/36
[52] U.S. Cl. ....................................... 30/380; 83/788; 474/189
[58] Field of Search ................... 30/380; 83/788, 820, 83/436, 880; 474/175, 185, 186, 188, 189

[56] References Cited

U.S. PATENT DOCUMENTS

| 377,161 | 1/1888 | Jebb | 474/188 |
|---|---|---|---|
| 1,530,682 | 3/1925 | Lyman | 30/380 |
| 2,082,684 | 6/1937 | Chachula | 474/189 |
| 2,391,642 | 12/1945 | Reed | 474/188 |
| 2,628,709 | 2/1953 | Steinmetz | 474/189 |
| 2,707,403 | 5/1955 | Thomson et al. | 474/188 |
| 2,798,518 | 7/1957 | Gray | 30/380 |
| 2,806,379 | 9/1957 | Haracz | 474/188 |
| 3,216,273 | 11/1965 | Colmer Jr. | 474/189 |
| 3,363,495 | 1/1966 | Turnbull | 83/788 |
| 3,888,131 | 6/1975 | Reid | 474/189 |
| 3,995,487 | 12/1976 | Locke | 474/188 |
| 4,282,409 | 8/1981 | Van Teslaar | 474/188 |

Primary Examiner—Paul A. Bell
Assistant Examiner—Paul M. Heyrana, Sr.
Attorney, Agent, or Firm—W. G. Fasse; D. H. Kane, Jr.

[57] ABSTRACT

In guide rollers (2) for band saws, especially for sawing meat and bones, the contact surface (4) is very quickly fouled or soiled by greasy fat, bone meal, etc., which has a disadvantageous effect on the power transmission and the guidance of the band saw blade (3). The contact surface (4) of the guide roller rim which guides the band saw blade, is provided with open passages (7) reaching to the side surfaces (5) of the guide roller rim. Fat and other contaminating material is pressed by the band saw blade into the passages and is flung away from the rotating guide roller (2), whereby a reliable operation of the band saw is assured.

1 Claim, 2 Drawing Figures

U.S. Patent

Nov. 18, 1986

4,622,748

GUIDE ROLLER FOR BAND SAWS

BACKGROUND OF THE INVENTION

The invention relates to a guide roller or guide wheel for band saws, especially for cutting meat and bones. Such rollers or wheels have a circumferential contact surface on which the band saw blade is guided.

The contact surfaces of known guide rollers or wheels are provided with circumferential slots or grooves, in order to improve the guiding of the band saw blade.

Especially in connection with cutting meat and bones a considerable fouling results because fat, bone meal and similar substances deposit on the contact surface of the guide rollers, which disadvantageously affects the power transmission and guidance of the band saw blade because the fat adhering to the contact surface reduces the friction between the contact surface and the band saw blade. Furthermore, the fouling quickly accumulates so heavily on the contact surface that the band saw blade runs off the guide roller or wheel.

The encircling circumferential grooves are supposed to avoid these disadvantages, however, the adhering dirt must be removed by additional strippers, which clean the contact surface as well as the grooves.

This measure is expensive since the roller or wheel strippers are subject to wear and tear and must constantly be checked for their troublr-free operation.

OBJECTS OF THE INVENTION

In view of the above it is the aim of the invention to achieve the following objects singly or in combination:
- to develop a guide wheel or roller of the initially mentioned type, on the contact surface of which fat and other contaminating substances cannot accumulate;
- to avoid longitudinal grooves and the cleaning of such grooves in the contact surface of such wheels or rollers; and
- to provide a guide roller or wheel for a band saw, which wheel or roller is substantially self-cleaning.

SUMMARY OF THE INVENTION

These objects have been achieved according to the invention in that the contact surface comprises open passages to the side surfaces of the rim of such wheels or rollers.

If dirt accumulates between the contact surface and the band saw blade, then such dirt is pressed into the passages by the band saw blade. Due to the slanted, outwardly extending structure of the passages, the dirt is constantly pushed further, until it is flung away from the rotating guide roller. This self-cleaning feature even applies when a fat layer is adhering to the contact surface because it is squeezed away by the band saw blade, so that a good adhesion between the contact surface and the band saw blade results.

The guide roller or wheel according to the invention thus exhibits an especially advantageous self-cleaning effect without additional strippers, and assures reliable operation of the band saw.

The guide roller or wheel according to the invention is not limited to use in band saws for cutting meat and bones. Such wheels may be used in all band saws with which the danger of fouling or soiling of the contact surfaces exists.

BRIEF FIGURE DESCRIPTION

Figure 2:
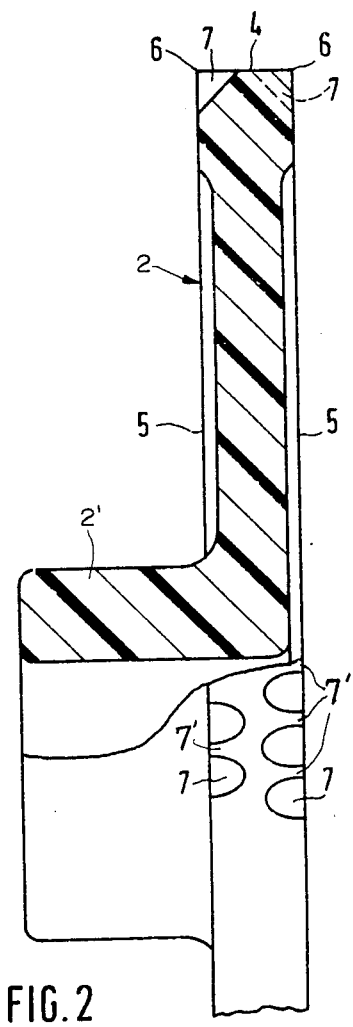

In order that the invention may be clearly understood, it will now be described, by way of example, with reference to the accompanying drawings, wherein:

FIG. 1 is a partial elevational front view of a band saw with an upper guide roller according to the invention; and FIG. 2 shows a side view of the guide roller, partially in section along line II—II in FIG. 1 and on an enlarged scale compared to FIG. 1.

DETAILED DESCRIPTION OF PREFERRED EXAMPLE EMBODIMENTS AND OF THE BEST MODE OF THE INVENTION

In FIG. 1 the upper part of a band saw has a housing 1 in which the upper guide roller 2 is rotatably supported. The following details also apply to the lower drivable guide roller which is not shown. The guide roller 2 guides a band saw blade 3, and is therefore constructed in the form of a sheave with a radially outer circumferential cylindrical contact surface 4 and two side surfaces 5 (also see FIG. 2), which meet at the edges 6 to form the rim of the wheel. The rim is connected to the hub 2' by conventional means, such as a solid disk or spokes. As especially shown in FIG. 2, these edges 6 are interrupted according to the invention by passages 7 in the form of slanted grooves, which exhibit a nearly semi-circular cross-section, and which reach from the contact surface 4 to the side surfaces 5 of the rim.

The grooves 7 reach close to the center circle of the contact surface 4, and the grooves 7 directed toward opposite side surfaces 5 are arranged in a staggered manner relative to one another, whereby an optimal removal of fat and contaminations is achieved. Moreover, the proper guidance of the band saw blade 3 is assured, because the grooves 7 are spaced from each other in the circumferential direction to leave lands 7' between adjacent grooves. These lands 7' assure the proper guiding of the band saw blade 3 in spite of the grooves 7.

If the guide roller or wheel 2 is advantageously constructed of a man-made material, for instance polyamid, then the grooves may be made in one operation during the injection molding which makes possible an easy and inexpensive manufacturing.

Although the invention has been described with reference to specific example embodiments, it will be appreciated, that it is intended to cover all modifications and equivalents within the scope of the appended claims.

What is claimed is:

1. A guide roller for band saws for cutting foodstuffs, comprising a hub, a circumferential rim having a radially outer cylindrical surface for contacting and guiding a band saw blade, means operatively securing said rim to said hub, said rim further comprising two lateral side surfaces one on each side, and a plurality of slanted grooves forming passages (7) extending from said radially outer cylindrical surface to both of said side surfaces for continuously removing contaminations from said radially outer cylindrical surface to said side surfaces thereby avoiding the accumulation of contaminations on said radially outer cylindrical surface, said slanted grooves having openings in said cylindrical surface which are circumferentially spaced from each other to provide lands (7') between adjacent groove openings, said lands together maintaining said radially outer surface sufficiently cylindrical for said guiding of said band saw blade, and wherein said slanted grooves reaching into one of said side surfaces are staggered relative to the slanted grooves reaching into the other side surface, whereby lands along one edge of said cylindrical surface face grooves along the opposite edge of said cylindrical surface and vice versa.

* * * * *